(12) United States Patent
Dahlheimer

(10) Patent No.: US 9,017,057 B2
(45) Date of Patent: Apr. 28, 2015

(54) DEVICE FOR PRODUCING PELLETS

(75) Inventor: Stefan Dahlheimer, Kleinostheim (DE)

(73) Assignee: Automatik Plastics Machinery GmbH, Grossostheim (DE)

( * ) Notice: Subject to any disclaimer, the term of this patent is extended or adjusted under 35 U.S.C. 154(b) by 197 days.

(21) Appl. No.: 13/607,468

(22) Filed: Sep. 7, 2012

(65) Prior Publication Data

US 2013/0004611 A1    Jan. 3, 2013

Related U.S. Application Data

(63) Continuation of application No. PCT/EP2011/001066, filed on Mar. 3, 2011.

(51) Int. Cl.
    *B29B 9/06*      (2006.01)

(52) U.S. Cl.
     CPC ..................................... *B29B 9/065* (2013.01)

(58) Field of Classification Search
     CPC ............ B29B 9/06; B29B 9/065; B29B 9/16; B29C 2793/0027; B29C 31/00
     USPC ......... 425/67, 68, 69, 70, 229, 232, 307, 311, 425/313, 378.1; 264/13, 14, 141, 142, 143, 264/232, 234, 237
     See application file for complete search history.

(56) References Cited

U.S. PATENT DOCUMENTS

| | | | |
|---|---|---|---|
| 3,709,641 A * | 1/1973 | Sarem .................................. | 425/7 |
| 5,895,617 A * | 4/1999 | Mizuguchi et al. ............ | 264/141 |
| 8,080,196 B2 * | 12/2011 | Martin et al. .................. | 264/142 |
| 8,083,509 B2 * | 12/2011 | Holmes et al. ................... | 425/67 |
| 8,361,364 B2 * | 1/2013 | Eloo et al. ...................... | 264/143 |
| 8,366,428 B2 * | 2/2013 | Eloo ................................ | 425/67 |
| 8,671,647 B2 * | 3/2014 | Boothe et al. ................ | 53/111 R |
| 2005/0110184 A1 * | 5/2005 | Eloo .............................. | 264/143 |
| 2007/0132134 A1 * | 6/2007 | Eloo .............................. | 264/143 |
| 2009/0028975 A1 * | 1/2009 | Eloo ................................ | 425/68 |
| 2009/0062427 A1 * | 3/2009 | Tornow et al. ................ | 523/223 |
| 2009/0110833 A1 * | 4/2009 | Wright et al. ................. | 427/299 |
| 2009/0134537 A1 * | 5/2009 | Eloo et al. ........................ | 264/14 |
| 2009/0203840 A1 * | 8/2009 | Martin et al. ..................... | 525/50 |
| 2009/0206507 A1 * | 8/2009 | Martin et al. .................. | 264/141 |
| 2009/0269428 A1 * | 10/2009 | Holmes et al. ..................... | 425/6 |
| 2009/0315206 A1 * | 12/2009 | Mann et al. .................... | 264/143 |
| 2011/0302889 A1 * | 12/2011 | Boothe et al. .................... | 53/513 |
| 2012/0012686 A1 * | 1/2012 | Nagaoka et al. ............ | 241/46.02 |
| 2013/0062804 A1 * | 3/2013 | Takamoto et al. ........... | 264/40.4 |

FOREIGN PATENT DOCUMENTS

| | | |
|---|---|---|
| DE | 102004050356 A1 | 7/2005 |
| EP | 2008784 A1 | 12/2008 |
| JP | 2003239216 A | 8/2003 |
| JP | 2007512162 A | 5/2007 |
| JP | 2008542062 A | 11/2008 |
| JP | 2009530142 A | 8/2009 |
| JP | 2010537851 A | 12/2010 |
| WO | 2007107584 A2 | 9/2007 |

* cited by examiner

*Primary Examiner* — Seyed Masoud Malekzadeh
(74) *Attorney, Agent, or Firm* — Buskop Law Group, PC; Wendy Buskop

(57) ABSTRACT

A device for producing pellets that has a perforated plate for extruding a melt into a process chamber, and a cutting device for cutting the melt into pellets. The process chamber can have an inlet and an outlet. A conveying device can deliver a process fluid through the inlet, and carry the process fluid and pellets through the outlet. The inlet can have an inlet opening and an inlet channel. A three-way valve can be located between the inlet channel, a process fluid supply line, and a process fluid discharge line, and below the inlet. The outlet can have a discharge opening and an outlet channel. A pneumatic device can provide compressed air to the process chamber for emptying and expelling the process fluid.

6 Claims, 2 Drawing Sheets

DEVICE FOR PRODUCING PELLETS

CROSS REFERENCE TO RELATED APPLICATIONS

The present patent application is a Continuation Application and claims the priority to and the benefit of co-pending International Patent Application No. PCT/EP2011/001066 filed Mar. 3, 2011, 2011, entitled "Device for Producing Pellets," which claims priority to DE Application No. 20 2010 003 348.9 which was filed Mar. 9, 2010. These references are incorporated in their entirety herein.

FIELD

The present embodiments generally relate to a device for producing pellets.

BACKGROUND

A need exists for a device for producing pellets that permits optimal, complete, and fast emptying of a process chamber of the device in a structurally simple and economical manner.

The present embodiments meet these needs.

BRIEF DESCRIPTION OF THE DRAWINGS

The detailed description will be better understood in conjunction with the accompanying drawings as follows.

Figure 1:
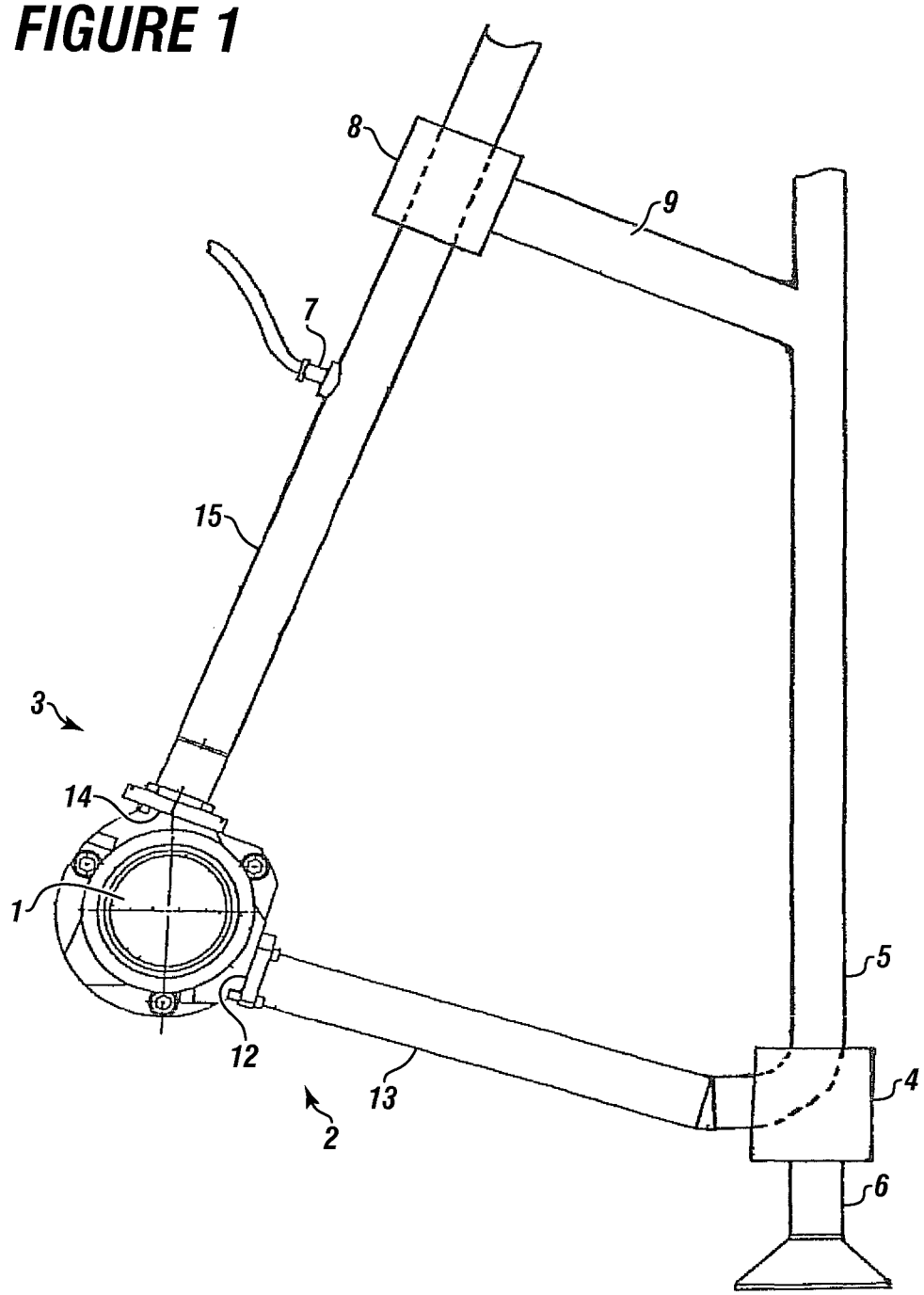
FIG. 1 depicts a device for granulating pellets during operation according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Granulating devices with extruders can be used for granulating thermoplastic materials, such as polyethylene or polypropylene. A molten plastic material can be pressed through nozzle openings of a device into a coolant, such as water, and can be severed by a cutter arrangement having at least one cutter that passes over the nozzle openings of the device. As such, pellets can be produced.

Underwater granulation can be performed by corresponding devices, known as units, such as by the SPHERO® from Automatik Plastics Machinery GmbH. Underwater granulation units can be emptied of process fluid, such as water, for maintenance purposes. The process chamber and supply lines can be emptied as completely as possible before the overall underwater granulation unit is opened.

The present embodiments relate to a device for producing pellets from a melt, such as a plastic melt.

The device for producing pellets can have a perforated plate with openings from which the melt can be extruded, a process chamber into which the melt can be extruded, and a cutting device for cutting strands of the melt extruded from the perforated plate into individual pellets.

The process chamber can have an inlet for filling with a process fluid and an outlet for the process fluid and the pellets.

A conveying device can deliver the process fluid into the process chamber through the inlet, and the process fluid with the pellets contained therein can be carried away from the process chamber through the outlet. The conveying device can be, for example, a pump device with an equalizing tank.

The inlet can be arranged at a level in a bottom half of the process chamber for improving emptying of the process chamber. The inlet can have an inlet opening in the process chamber and an inlet channel arranged to lead to the process chamber. The inlet channel can be arranged to lead away from the process chamber below the level.

A three-way valve, which can establish a fluid connection between two ports of the three-way valve in each position, can be provided between the inlet channel, a process fluid supply line that can have a connection to the conveying device, and a process fluid discharge line leading downward from the three-way valve. The three-way valve can be located below the level of the inlet.

The outlet from the process chamber can be located in a top half of the process chamber, and can have a discharge opening in the process chamber and an outlet channel arranged to lead away from the process chamber. The outlet channel can be arranged to lead away from the process chamber in a straight line and tangentially.

A pneumatic device can be connected to the process chamber through a valve on the outlet channel, such that the process chamber can be filled with compressed air from the pneumatic device, such as for emptying the process chamber of the process fluid, so that the process fluid can be expelled from the process chamber through the inlet opening, the inlet channel, the three-way valve, and the process fluid discharge line.

A reliable and fast emptying capability of the process chamber and an entire corresponding unit section of the device for producing pellets can be provided for by placement of the three-way valve at a lowest point in the device for producing pellets below the process chamber, the inlet, the inlet channel, the outlet, the outlet channel, and a supply of the compressed air through the valve at the outlet channel. The structure required for emptying, with the valve for compressed air delivery and the three-way valve at the lowest point, can thus be constructed in a simple manner.

The inlet opening can be designed such that the inlet opening is at a level located at a height of a lowest level of the process chamber, with the three-way valve located below the lowest level; thereby permitting the most complete emptying possible, even with little additional pressure, such as with the assistance of gravity in a region of the process chamber.

In order to deliver the compressed air overpressure that the pneumatic device can provide through the valve and into the process chamber to the process chamber in a targeted manner without the overpressure reaching other parts of the system, and in order at the same time to be able to maintain the circulation and/or pressure level of the process fluid in other parts of the system to the greatest possible extent, the device for producing pellets can have a bypass line arranged in fluid communication between the outlet channel and the process fluid supply line, and a three-way bypass valve can be provided in the outlet channel. The three-way bypass valve can be more distant from the process chamber in a discharge direction, as viewed from the process chamber, than an air valve in the outlet channel. As such, either the outlet channel can be continuously connected and the bypass line can be isolated from the outlet channel during an operating state of the device for producing pellets, or the bypass line can be connected to a part of the outlet channel located distant from the process chamber for emptying thereof, with the outlet channel closed off upstream of the valve at a corresponding location of the three-way bypass valve further away from the process chamber than the valve.

In operation, the functions of the outlet and the inlet at the process chamber can be interchanged, such that the inlet can be located in the top region of the process chamber and the outlet can be located in the bottom region of the process chamber.

In operation, during granulation, the process fluid can be delivered in a circulating manner by the process fluid supply line through the three-way valve, the inlet channel, and the inlet opening of the process chamber. The process fluid, with the pellets contained therein, can be carried onward away from the process chamber through the outlet with the discharge opening and the outlet channel, without the pneumatic device blowing any compressed air into the outlet channel through the valve for emptying of the process chamber. The three-way bypass valve can also be actuated, such that the outlet channel can be continuously connected to be open and the bypass line can be isolated from the outlet channel.

During emptying of the device for producing pellets, the three-way bypass valve can be actuated, such that a region of the outlet channel adjacent to the process chamber can be closed off or isolated from another region of the outlet channel that is more distant from the process chamber, while the other region of the outlet channel that is more distant from the process chamber can have a connection to the bypass line.

For emptying the process chamber, the pneumatic device can deliver the compressed air through the valve and the discharge opening of the process chamber, and the process fluid can be expelled through the process fluid discharge line or other appropriate part of the device for producing pellets, such as through the inlet opening, the inlet channel, and the three-way valve; since the three-way valve can connect the inlet channel to the process fluid discharge line.

In this state, the circulation and pressure level of the process fluid in other parts of the device for producing pellets can be maintained at the same time, because a fluid connection between the outlet channel, such as the part of the outlet channel more distant from the process chamber, and the process fluid supply line can exist by means of the bypass line and the actuated three-way bypass valve. The outlet channel and the process fluid supply line can be in fluid connection with other parts of the device for producing pellets, such that the process fluid can flow and/or be maintained under pressure in these parts of the device for producing pellets despite the process of emptying the process fluid.

Turning now to the Figures, FIG. 1 depicts a schematic lateral top view of a part of a device for producing pellets during operation according to one or more embodiments.

The device for producing pellets can have a perforated plate with openings from which a melt, such as plastic melt, can be extruded.

The device for producing pellets can have a process chamber 1, into which the melt can be extruded, and a cutting device for cutting strands of the melt extruded from the perforated plate into individual pellets.

The process chamber 1 can have an inlet 2 for filling with a process fluid, such as water, and an outlet 3 for the process fluid and the pellets present therein.

A conveying device can deliver the process fluid into the process chamber 1 through the inlet 2, and carry the process fluid with the pellets contained therein away from the process chamber 1 through the outlet 3.

The inlet 2 can be arranged at a level in the bottom half of the process chamber 1, and can have an inlet opening 12 in the process chamber 1 and an inlet channel 13 arranged to lead tangentially to the process chamber 1. The inlet opening 12 can have a level located at the height of the lowest level of the process chamber 1. The inlet channel 13 can be arranged to lead to the process chamber 1 at an angle from below the process chamber 1.

A three-way valve 4 can be located between the inlet channel 13, a process fluid supply line 5 that connects with the conveying device, and a process fluid discharge line 6 leading downward from the three-way valve 4. The three-way valve 4 can be located below the level of the inlet 2 and below the lowest level of the process chamber 1.

The outlet 3 can be located in the top half of the process chamber 1, and can have a discharge opening 14 in the process chamber 1 and an outlet channel 15 arranged to lead tangentially away from the process chamber 1 in a straight line.

A pneumatic device can be connected to the process chamber 1 through a valve 7 on the outlet channel 15, such that the process chamber 1 can be filled with compressed air from the pneumatic device for emptying the process chamber 1 of the process fluid. As such, after appropriate actuation of the three-way valve 4, the process fluid can be expelled from the process chamber 1 through the inlet opening 12, the inlet channel 13, the three-way valve 4, and the process fluid discharge line 6.

In the operating state, the three-way valve 4 can be actuated, such that a fluid connection is present between the process fluid supply line 5 and the inlet channel 13. In the operating state, the valve 7 can be closed.

A bypass line 9 can be arranged in fluid connection between the outlet channel 15 and the process fluid supply line 5.

A three-way bypass valve 8 can be provided in the outlet channel 15 more distant from the process chamber 1 in the discharge direction as viewed from the process chamber 1 then the valve 7, such that the three-way bypass valve 8 is downstream of the flow of the process fluid in the operating state. The three-way bypass valve 8 can be provided in the outlet channel 15, such that the outlet channel 15 can be continuously connected and the bypass line 9 can be isolated from the outlet channel 15.

The direction of flow of the process fluid during operation of the embodiment depicted in FIG. 1 can run clockwise. However, the direction of flow of the process fluid during operation can also run counterclockwise, such that the functions of the outlet 3 and the inlet 2 at the process chamber 1 can be interchanged.

Figure 2:
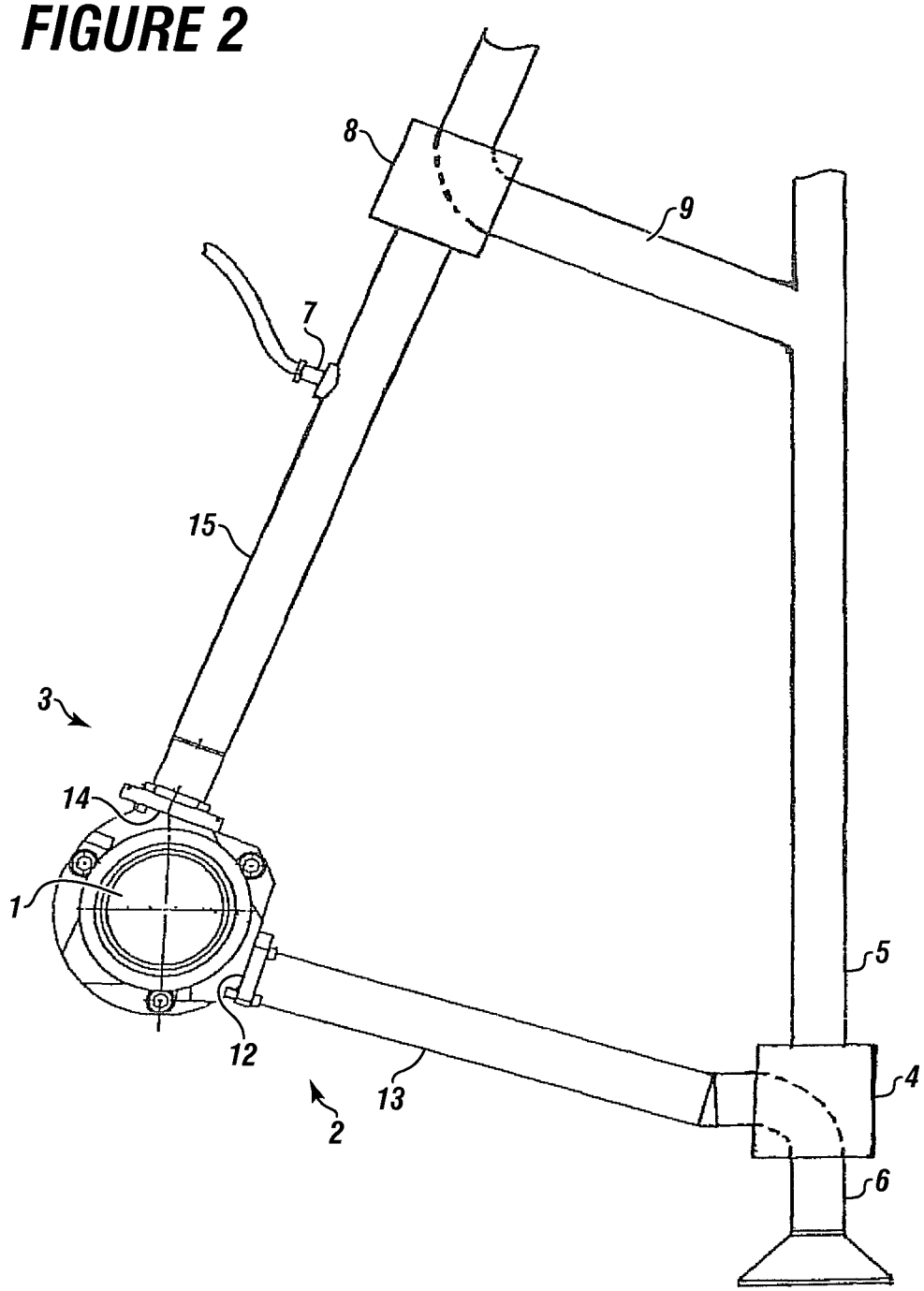
FIG. 2 depicts a device for granulating pellets during emptying according to one or more embodiments.

FIG. 2 depicts a schematic lateral top view of a part of the device for producing pellets during the emptying process according to one or more embodiments.

During the emptying process, the bypass line 9 can be connected by means of the three-way bypass valve 8 to the part of the outlet channel 15 located more distant from the process chamber 1; thereby the bottom part of the outlet channel 15 adjacent to the process chamber 1 can be isolated from the top part of the outlet channel 15 of the outlet 3.

In the emptying process, the three-way valve 4 can be actuated such that a fluid connection is present between the inlet channel 13 of the inlet 2 and the process fluid discharge line 6, rather than the inlet channel 13 and the process fluid supply line 5.

In the emptying process, the pneumatic device can deliver compressed air to the process chamber 1 through the valve 7 to empty the process chamber 1 through the outlet channel 15 and the discharge opening 14, such that the process fluid can be expelled through the inlet opening 12, the inlet channel 13, and the three-way valve 4 above the process fluid discharge line 6.

The device for producing pellets or a corresponding unit thereof, such as the process chamber 1, can be completely emptied of the process fluid. As such, reliable, fast, simple, and complete emptying of the device for producing pellets or the process chamber 1 can be achieved.

While these embodiments have been described with emphasis on the embodiments, it should be understood that within the scope of the appended claims, the embodiments might be practiced other than as specifically described herein.

What is claimed is:

1. A device for producing pellets comprising:
   a. a perforated plate with openings from which a melt is extruded;
   b. a cutting device for cutting strands of the melt extruded from the perforated plate into pellets;
   c. a process chamber into which the melt is extruded, wherein the process chamber comprises:
      (i) an inlet for filling with a process fluid, wherein the inlet is located at a height of a lowest level of the process chamber for improving emptying of the process chamber, and further wherein the inlet comprises an inlet opening in the process chamber and an inlet channel arranged to lead tangentially to the process chamber; and
      (ii) an outlet for the process fluid and the pellets, wherein the outlet is located in a top half of the process chamber and comprises a discharge opening in the process chamber and an outlet channel arranged to lead tangentially away from the process chamber;
   d. a conveying device for delivering the process fluid into the process chamber through the inlet, and for carrying the process fluid with the pellets contained therein away from the process chamber through the outlet;
   e. a three-way valve between the inlet channel, a process fluid supply line, and a process fluid discharge line leading downward from the three-way valve, wherein the three-way valve is located below the level of the inlet and below the lowest level of the process chamber; and
   f. a pneumatic device connected to the process chamber through a valve on the outlet channel wherein the pneumatic device is configured to provide compressed air the process chamber for expelling the process fluid from the process chamber through the inlet opening, the inlet channel, the three-way valve, and the process fluid discharge line to empty the process chamber of the process fluid.

2. The device for producing pellets of claim 1, wherein a bypass line is arranged in fluid connection between the outlet channel and the process fluid supply line, wherein a three-way bypass valve is in the outlet channel more distant from the process chamber in the discharge direction as viewed from the process chamber than the valve in the outlet channel such that either:
   a. the outlet channel is continuously connected and the bypass line is isolated from the outlet channel; or
   b. the bypass line is connected to a part of the outlet channel located distant from the process chamber.

3. The device for producing pellets of claim 1, wherein functions of the outlet and the inlet at the process chamber are interchangeable.

4. The device for producing pellets of claim 3, wherein a bypass line is arranged in fluid connection between the outlet channel and the process fluid supply line, wherein a three-way bypass valve is in the outlet channel more distant from the process chamber in the discharge direction as viewed from the process chamber than the valve in the outlet channel such that either:
   a. the outlet channel is continuously connected and the bypass line is isolated from the outlet channel; or
   b. the bypass line is connected to a part of the outlet channel located distant from the process chamber.

5. The device for producing pellets of claim 4, wherein functions of the outlet and the inlet at the process chamber are interchangeable.

6. The device for producing pellets of claim 1, wherein functions of the outlet and the inlet at the process chamber are interchangeable.

* * * * *